United States Patent
Binder et al.

(10) Patent No.: US 11,901,781 B2
(45) Date of Patent: Feb. 13, 2024

(54) BRUSHLESS ELECTRICAL MACHINE

(71) Applicant: Robert Bosch GmbH, Stuttgart (DE)

(72) Inventors: Christian Binder, Mainhardt (DE); Oliver Fuchs, Ilsfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 414 days.

(21) Appl. No.: 17/280,652

(22) PCT Filed: Dec. 18, 2018

(86) PCT No.: PCT/EP2018/085604
§ 371 (c)(1),
(2) Date: Mar. 26, 2021

(87) PCT Pub. No.: WO2020/125957
PCT Pub. Date: Jun. 25, 2020

(65) Prior Publication Data
US 2021/0344265 A1 Nov. 4, 2021

(51) Int. Cl.
*H02K 29/08* (2006.01)
*H02K 11/215* (2016.01)

(52) U.S. Cl.
CPC .......... *H02K 29/08* (2013.01); *H02K 11/215* (2016.01)

(58) Field of Classification Search
CPC .............................. H02K 29/08; H02K 11/215
See application file for complete search history.

(56) References Cited

U.S. PATENT DOCUMENTS

| | | |
|---|---|---|
| 10,080,618 B2 | 9/2018 | Marshall et al. |
| 2003/0145663 A1 | 8/2003 | Heisenberg et al. |
| 2009/0230824 A1 | 9/2009 | Hornberger et al. |
| 2010/0079102 A1* | 4/2010 | Servidone ................. H02P 8/32 318/685 |
| 2011/0187356 A1 | 8/2011 | Li et al. |
| 2015/0303845 A1 | 10/2015 | Suda et al. |
| 2018/0106642 A1* | 4/2018 | Schliesch ............. H02K 11/215 |
| 2020/0176160 A1* | 6/2020 | Haham Hay ......... H01F 7/0247 |

FOREIGN PATENT DOCUMENTS

| | | |
|---|---|---|
| DE | 19818799 C2 | 12/1999 |
| EP | 1568971 A1 | 8/2005 |
| EP | 2477004 A1 | 7/2012 |
| JP | H0556619 A | 3/1993 |
| JP | 2004201456 A | 7/2004 |
| JP | 2005318744 A | 11/2005 |

OTHER PUBLICATIONS

International Search Report for PCT/EP2018/085604, dated Jul. 22, 2019.

* cited by examiner

*Primary Examiner* — Zoheb S Imtiaz
(74) *Attorney, Agent, or Firm* — NORTON ROSE FULBRIGHT US LLP; Gerard A. Messina

(57) ABSTRACT

A brushless electrical machine, in particular, a brushless d.c. motor, having a housing, at least one rotor, which is positioned on a shaft rotationally mounted in the housing, and a stator attached to the housing; the rotor being assigned a rotor position detection device, which operates contactlessly and includes a multipole magnetic ring positioned on the shaft in a rotatably fixed manner and at least one sensor, which is sensitive to magnetic fields and is attached to the housing radially with respect to the outer circumference of the magnetic ring. The number of pole pairs of the rotor and the number of pole pairs of the magnetic ring are coprime.

11 Claims, 3 Drawing Sheets

|     | $\alpha$ | $\omega_1$ | $\beta_1$ | $\omega_2$ | $\beta_2$ |
|-----|----------|------------|-----------|------------|-----------|
| I   | 0°       | 0          | 0°        | -          | -         |
| II  | +18°     | >0         | -36°      | <0         | +18°      |
| III | +36°     | >0         | -36°      | 0          | 0         |
| IV  | -36° (≙54°) | <0      | +36°      | 0          | 0         |
| V   | -18° (≙72°) | <0      | +36°      | >0         | -18°      |

BRUSHLESS ELECTRICAL MACHINE

FIELD

The present invention relates to a brushless electrical machine, in particular, a brushless d.c. motor, having a housing, at least one rotor, which is positioned on a shaft rotationally mounted in the housing, and a stator attached to the housing; the rotor being assigned a rotor position detection device, which operates contactlessly and includes a multipole magnetic ring positioned on the shaft in a rotatably fixed manner and at least one sensor, which is sensitive to magnetic fields and is attached to the housing radially with respect to the outer circumference of the magnetic ring.

BACKGROUND INFORMATION

Brushless electrical machines are available in the related art. For their operation, it is important that the current angle of rotation, that is, the current angular position, of the rotor be able to be determined accurately, in order to be able to control the stator. Correct commutation of the electrical machine is only possible with knowledge of the current angular position. Thus, conventionally, for example, in the case of a permanent-magnet synchronous motor, a signal generator may be attached in a rotatably fixed manner with respect to the rotor, and a sensor element, which monitors the magnetic field of the signal generator, may be situated axially to it, so that the full 360° angle of rotation of the signal generator may be ascertained by the sensor. In this manner, the electrical machine is controllable immediately after the system is started, since the current angle of rotation is immediately known. In addition, in a conventional design, the signal generator includes a multipole magnetic ring. An advantage of this is that more options are available for the system, since, for example, the magnetic ring may also be placed between the rotor and a mechanical output (a driving pinion mounted rigidly to the shaft) of the electrical machine. However, this requires the sensor to be attached to the housing radially with respect to the magnetic ring. Consequently, the mechanical angle of rotation of the rotor may not be ascertained readily from the sensor signal in an unequivocal manner.

SUMMARY

An electrical machine of the present invention, in accordance with an example embodiment of the present invention, may have an advantage that an advantageous development of the electrical machine allows the sensor signal to be assigned to an angle of rotation, that is, an angular position, of the rotor in an unequivocal manner. To that end, the present invention provides that the number of pole pairs of the rotor and the number of pole pairs of the magnetic ring be coprime. The coprime number of pole pairs allows an angular segment of the magnetic ring and, as a function of the measured angular segment, the current angle of rotation, to be ascertained from the sensor signal within a very short time, with the aid of, in particular, the Nonius or Vernier principle. Thus, the present invention provides an advantageous approach for unequivocally determining the angle of rotation with only a small amount of extra outlay. Consequently, the electrical machine is, indeed, not controllable immediately after initial operation, since the direction, in which current and voltage must be adjusted for the control, is not known; however, the angular position and, therefore, the input of current and voltage, are ascertainable in a sufficiently short time at a sufficiently small load torque.

According to a preferred specific embodiment of the present invention, the number of pole pairs of the rotor is 4. Thus, the rotor corresponds to a rotor often used, and rotors already present may be reverted to without extra expense.

The number of pole pairs of the magnetic ring is preferably 5, thereby yielding the coprime numbers of pole pairs. Since the magnetic ring itself is constructed in a less complicated manner than the rotor, an adjustment of the number of pole pairs to 5 or another prime number of pole pairs may be carried out inexpensively. Thus, in particular, the number of pole pairs of the rotor of the electrical machine is 4, and the number of pole pairs of the magnetic ring of the electrical machine is 5.

In this context, the number of pole pairs of the magnetic ring determines the number of angular segments of the rotor position detection device. When the system is started, the angular segment, in which the rotor and/or magnetic ring resides, is initially ascertained, and subsequently, the current angle of rotation is determined as a function of the measured angular segment. To this end, in particular, the following method, which is preferably implemented and/or implementable by a control unit of the electrical machine, is carried out. After initialization of the electrical machine, the mechanical angle is determined unequivocally in the angular range of 0 to 360°, and all corrections, which could be a function of the mechanical angle, may now be applied, so that advantageous commutation of the electrical machine in subsequent operation is ensured.

According to one preferred further refinement of the present invention, the brushless electrical machine includes a control unit, which is specially adapted to determine an angular segment as a function of the signal of the sensor, and to determine the angle of rotation as a function of the ascertained angular segment, as already described above. This yields the advantages mentioned already. To that end, the control unit is suitably connected to the sensor, in particular, to an output of the sensor, in an electrical manner. In particular, the control unit is configured to evaluate the output signal of the sensor, in order to evaluate the magnetic fields of the magnetic ring, as well as their orientations and effect on the sensor. A TMR sensor (TMR=tunnel magnetoresistance or magnetoresistive effect) is preferably available as a sensor.

In particular, in order to ascertain the angular segment, the control unit initially induces a first current in the stator to turn the rotor in a first direction of rotation, into a first selected angular segment; and a monitoring device, with the aid of which the rotor is monitored for an angular motion, is present. If the machine, that is, the rotor, remains stopped at the beginning, then the rotor is already located in the selected, first angular segment. With knowledge of the angular segment, the angular position is now determined as a function of the sensor signal, with the aid of the angular segment. However, if it is detected that the rotor moves, that is, rotates, then it follows that the initial position of the rotor was not in the selected, first angular segment. This already narrows down the search for the correct angular segment. The control unit preferably includes at least a volatile or nonvolatile memory, in which the ascertained result is stored for later use. In particular, whether or not the rotor turns, and if yes, in which direction (for example, left or right), are stored.

Thus, the monitoring device and/or the control unit is preferably configured to monitor the rotation for a direction of rotation. As a function of the detected direction of rotation during the rotation of the first instance of activation, the control unit carries out a second instance of activation of the rotor, which further limits the selection of the angular segments. Through knowledge of the direction of rotation, it may be determined if the rotor moves in the first direction of rotation, as expected, or in the opposite direction of rotation. Depending on whether the rotor moves in the expected direction of rotation or in the opposite direction of rotation, the rotor is subsequently activated or acted upon by the control unit, using a second current, with the objective of a particular direction of rotation.

If the rotor moves in the direction of rotation opposite to the first direction of rotation, that is, expected direction of rotation, then, in the following step, the control unit is particularly preferably configured to act upon the stator, preferably, using a second current, in order to turn the rotor two angular segments in a direction of rotation opposite to the first direction of rotation; and a further rotation is monitored for by the monitoring device. If the rotor does not move, that is, if the rotor is determined to be at rest after the expiration of a specifiable period of time, then, in the case of the above-described exemplary embodiment having a pole-pair number ratio of 4:5, it is determined that the rotor is located in the third or fourth segment (as a function of the direction of rotation at the beginning of the method). Consequently, the angular segment is known, and the angular position may be ascertained unequivocally as a function of the sensor signal.

In accordance with an example embodiment of the present invention, the control unit is preferably configured to monitor the further rotation for a direction of rotation, that is, to determine the direction of the rotation, with the aid of the monitoring device. In this context, one proceeds as described above. In particular, the detected direction of rotation is compared to the second direction of rotation, that is, to the direction of rotation opposite to the first direction of rotation. For that purpose, the stored directions of rotation and angular motions in the memory are fetched out and compared to each other by the control unit. To that end, the control unit includes, in particular, evaluating logic, which is implemented by a microprocessor and/or an integrated circuit. If the rotor moves in the direction opposite to the one desired, the stator is adjusted, using a third current, in order to turn the rotor only one angular segment in the opposite direction. The rotor must now come to a stop, and the current angular segment may be determined. Depending on the direction of the correction, the rotor and/or magnetic ring was in the second or fourth angular segment when the system was started.

Further advantages and preferred features and combinations of features may be derived from the disclosure herein. Below, the present invention is explained in greater detail in light of the figures.

DETAILED DESCRIPTION OF EXAMPLE EMBODIMENTS

Figure 1:
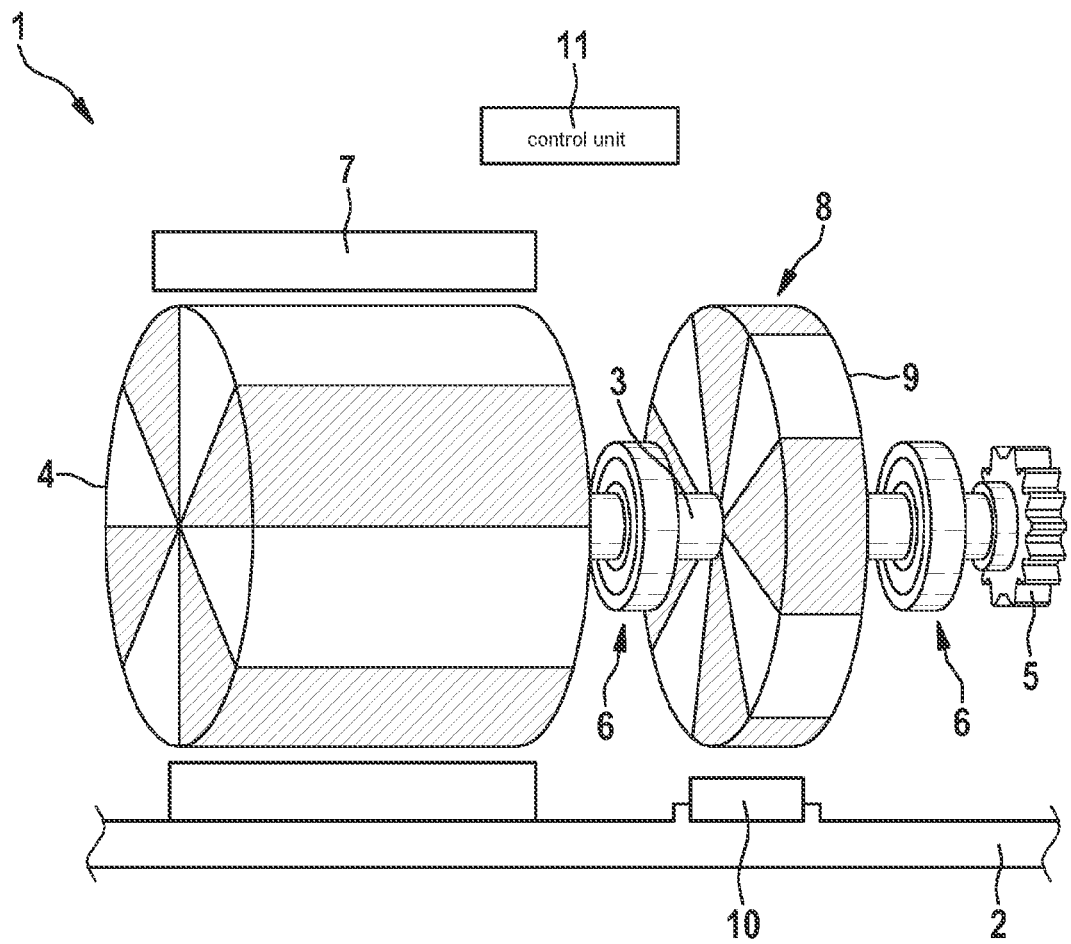
FIG. 1 shows a simplified perspective view of a brushless electrical machine, in accordance with an example embodiment of the present invention.

FIG. 1 shows a simplified view of a brushless electrical machine 1 that includes a housing 2, in which a shaft 3 is rotationally mounted. A rotor 4 and, at a free end, a driving pinion 5, are mounted on shaft 3 in a rotatably fixed manner. Shaft 3 is rotationally mounted in housing 2, using a plurality of bearings 6, in particular, rolling element bearings. Rotor 4 is also assigned a stator 7 having at least one stator winding capable of being supplied with current; stator 7 being positioned coaxially to rotor 4.

In addition, a magnetic signal generator 8 in the form of a multipole magnetic ring 9 is mounted on shaft 3, between rotor 4 and driving pinion 5, in a rotatably fixed manner. A sensor 10, which is attached to the housing and is designed to be sensitive to magnetic fields, is assigned to magnetic ring 9. Thus, sensor 10 is used as a signal receiver of signal generator 8.

The number of pole pairs of rotor 4 and of magnetic ring 9 are designed to be coprime. According to the present exemplary embodiment, the number of pole pairs of rotor 4 is $z_4=4$, and the number of pole pairs of magnetic ring 9 is $z_9=5$. Using the sensor device made up of sensor 10 and magnetic ring 9, the angular position of rotor 4, in particular, at the start of the system of electrical machine 1, is determined with the aid of control unit 11, which is adapted to carry out the method described in the following.

Figure 2:
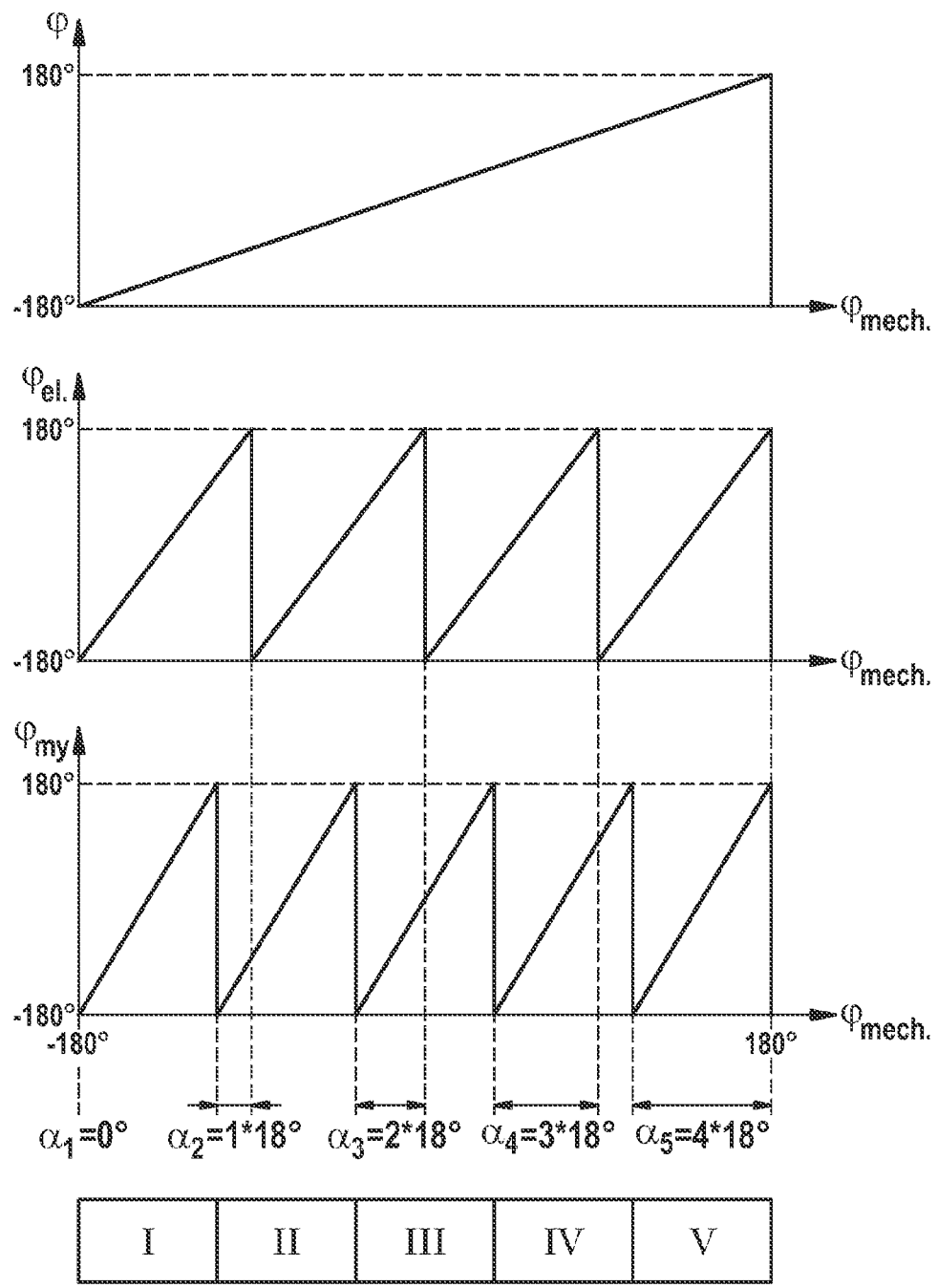
FIG. 2 shows a graph for explaining an advantageous operating method, in accordance with an example embodiment of the present invention.

To this end, in several graphs, FIG. 2 initially shows the behavior of electrical machine 1 over mechanical angle of rotation $\varphi_{mech}$. In this context, the uppermost graph shows the characteristic curve of mechanical angle of rotation $\varphi_{mech}$. The graph underneath it shows the electrical angle of rotation of the rotor 4 having 4 pole pairs. The underlying graph shows the magnetic angle of rotation of magnetic ring 9 versus mechanical angle of rotation 4. The lowest portion of FIG. 2 shows the angular segments I through V defined by magnetic ring 9, due to its pole-pair number of 5.

With the aid of the Nonius or Vernier Principle for determining the current angle of rotation of rotor 4, control unit 11 is configured to initially determine the angular segment, in which the current angle of rotation of rotor 4 lies, and, with the aid of the signal acquired by the sensor, to determine the current angle of rotation as a function of the determined angular segment. At a sufficiently low load torque, the angular segment may be identified within a short period of time with the aid of the Nonius or Vernier principle.

Subsequently, the exact mechanical angle $\varphi$, including all angle corrections, is certain. To that end, when the system is started, the sensor device is first initialized. That is, the angular segment, in which magnetic ring 9 is situated, is ascertained. This is achieved with the aid of the method, which is described in the following with reference to FIGS. 3 and 4 and determines the correct angular segment by adjusting an electric field or current.

Due to the number $z_9=5$ of pole pairs, there are presently five different angular positions, in which rotor 4 may magnetically lock into place in the de-energized state, which means that when the rotor is at a dead stop, there are five different angular segments I through V, in which it may be located. The correct angular segment I through V is ascertained with the aid of the advantageous method. For this, it is preferably intended that the method only be carried out, if, upon start-up, electrical machine 1 may reach a low-torque or torque-free state, in order that the locking into place of rotor 4 is reliably ensured.

As FIG. 2 shows, based on the coprime pole pairing, angular offsets of multiples of 18° result: $360°/(z_4 \times z_9)=18°$. In this context, on the basis of the overtravel of a circle, the following is valid: A trailing angle $\alpha_4$ of $3\times18°$ also corresponds to a trailing angle $\alpha_4=-2\times18°$. Similarly, a trailing angle $\alpha_5=4\times18°$ corresponds to a trailing angle of $\alpha_5=-1\times18°$; thus, it depends on the direction of rotation of rotor 4. For improved understanding, the following trailing angles are used below: 0°; 18°; 36°; −36°; −18°.

The method, which is described in the following and is executed by control unit 11, allows the current to be switched on rapidly, so that a particularly short initialization time is ensured; electrical machine 1, which takes the form of a permanent-magnet d.c. motor, remaining almost motionless upon being switched on, and it being possible for a brief ramp-up of the current to already suffice for the initialization and determination of the current angle of rotation of rotor 4. It is assumed that a jammed electrical machine 1 and/or a jammed rotor 4 may be ruled out.

With the knowledge that there are presently five different angular offsets of magnetic ring 9 due to its number of pole pairs $z_5=5$, in the approximation method, the correct angular segment I through V may be ascertained with the aid of a maximum of two corrections.

To that end, after initialization of the system in step S1, in step S2, the stator is initially acted upon by a current in such a manner, that rotor 4 is adjusted in the direction of segment I. In this instance, in a step S3, rotor 4 is monitored for an angular motion. In a substep S3a, it is initially checked if the angular motion occurs in the predetermined direction, and in a substep S3b, it is checked if an angular motion occurs in a direction opposite to the predefined direction of rotation. If the inquiry reveals that no angular motion has taken place, since one in neither the direction of rotation, nor contrary to the direction of rotation, has been detected (n), then, in step S4, it is determined that rotor 4 is already in angular segment I.

However, if rotor 4 turns in the desired direction of rotation when inquiry S3a is answered in the positive (y), then, in step S5, the phase angle is adjusted by two segments in the opposite direction as a first correction angle $\beta_1$, so that the rotor is turned two angular segments in the opposite direction. If rotor 4 stops, then, when the system was started, rotor 4 was in third segment III, depending on which direction of rotation was selected at the beginning. This is checked in step S6. If the machine moves in the direction opposite to the selected direction (y), then, in step S7, the phase angle is adjusted once more by one segment in the opposite direction, in the form of second correction angle $\beta_2$. Rotor 4 must stop, now. When the system was started, magnetic ring 9 was in the second segment II, depending on the direction of the correction. If the inquiry in step S6 reveals that rotor 4 did not move (n), then, in a step S8, it is determined that the rotor was in the third segment, and further activation is not necessary.

If the inquiry in step S3b reveals that rotor 4 turned in the direction opposite to the first direction of rotation (y), then, in a step S9, stator 7 is acted upon by a current in such a manner, that the rotor is turned two angular segments ($\beta_1=+36°$) in the opposite direction. In the following inquiry S10, it is checked once more if the angular movement occurred in the desired direction. If this is the case (y), then, in step S11, stator 7 is again acted upon by a current in such a manner, that rotor 4 turns by one angular segment $\beta_2=-18°$ in a direction opposite to the first direction of rotation, which means that it may be established, that rotor 4 is now in fifth angular segment V.

If the inquiry in step S10 reveals that rotor 4 is not moving, then no further activation is necessary, and in step S12, it is determined that rotor 4 was already in angular segment IV.

Figures 3, 4:
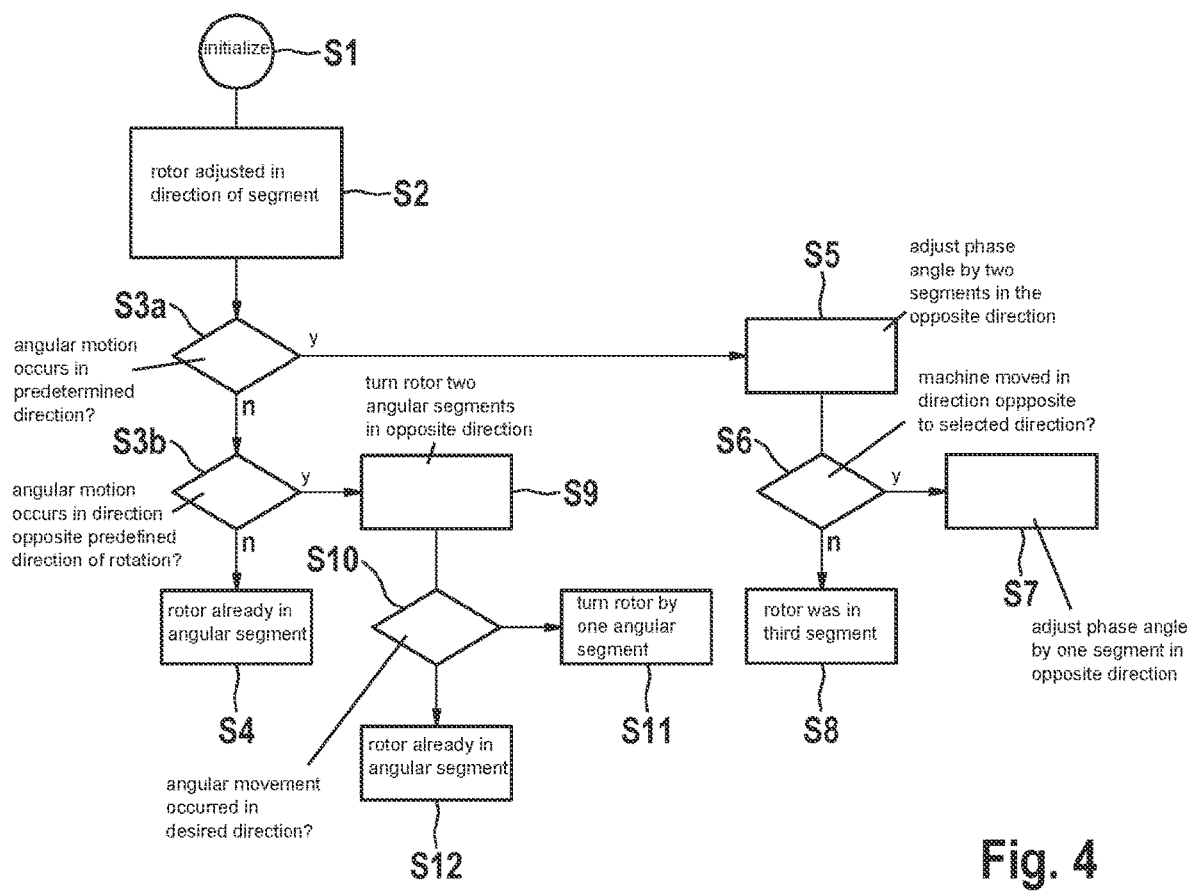
FIG. 3 shows a table for clarifying the method in accordance with an example embodiment of the present invention.
FIG. 4 shows a flow chart for explaining the method, in accordance with an example embodiment of the present invention.

In addition, FIG. 3 shows the method for the present exemplary embodiment in a table. Segments I through V are listed in the first column. Trailing angle $\alpha$ is given in the second column. Speed $\Omega_1$, which is measured after the first instance of switching on the current, is in the third column. The speed is calculated, in particular, with the aid of the signal of sensor 10. First correction angle $\beta_1$ is listed in the fourth column, speed $\Omega_2$, which is attained when the current is switched on a second time, is given in the fifth column, and second correction angle $\beta_2$ is listed in the last column.

The above-described method and control unit 11 may be applied and used, respectively, in all coprime combinations of the numbers of pole pairs of rotor 4 and of magnetic ring 9; the individual steps then being adapted appropriately, in order to obtain unequivocal results.

What is claimed is:

1. A brushless electrical machine, comprising:
    a housing;
    at least one rotor, which is positioned on a shaft for being rotationally moved in the housing by a motor;
    a stator attached to the housing; and
    a rotor position detection device, the rotor being assigned the rotor position detection device, the rotor position detection device being configured to operate contactlessly and includes a multipole magnetic ring positioned on the shaft in a rotatably fixed manner, and at least one sensor, which is sensitive to magnetic fields and is attached to the housing radially with respect to an outer circumference of the magnetic ring; and
    a control unit
    wherein:
        a number (x) of pole pairs of the rotor and a number (y) of pole pairs of the magnetic ring are coprime; and
        the control unit is configured to, upon the motor being switched on, determining in which of a plurality of predefined angular segments an angular position of the rotor is located;
        each of the plurality of predefined angular segments includes a respective range of degrees, with a combination of the respective ranges totaling 360°;
        the determining is performed by executing a program that predefines:
            an algorithmic sequence of steps of (a) respective outputs of current corresponding to respective target movements of the rotor in respective predefined directions by a respective number of degrees and (b) respective subsequent determinations of whether the rotor moved in the respective predefined directions to which the respective outputs correspond; and
            different combinations of, during the sequence of steps, determinations of the rotor, in response to the respective outputs of current, (a) moving in the respective predefined directions, (b) moving opposite to the respective predefined directions, and (c) not moving in response to the respective outputs of current as indicating the rotor to be positioned in a respective one of the plurality of predefined angular segments, the predefined different combinations including, for each of the predefined angular segments, at least one respective combination that, when determined by the control unit to occur, results in a respective determination by the control unit of the rotor being positioned in the respective predefined angular segment.

2. The brushless electrical machine as recited in claim 1, wherein the brushless electrical machine is a brushless d.c. motor.

3. The brushless electrical machine as recited in claim 1, wherein the number x of pole pairs of the rotor is 4.

4. The brushless electrical machine as recited in claim 1, wherein the number of pole pairs y of the magnetic ring is 5.

5. The brushless electrical machine as recited in claim 1, wherein the number of pole pairs of y the magnetic ring determines a number of the angular segments that are predefined for the determination of the angular position of the rotor detection device.

6. The brushless electrical machine as recited in claim 1, wherein the first one of the target movements is a turn of the rotor in a first direction of rotation, into the first of the segments.

7. The brushless electrical machine as recited in claim 6, wherein the second one of the target movements is a turn of the rotor by two of the predefined segments in a direction of rotation opposite to the first one of the target movements.

8. The brushless electrical machine as recited in claim 7, wherein the control unit is configured to perform another of the current outputs having a target movement of the rotor la one of the angular segments in a same direction as the first one of the target movements when the program defines that the rotor is determined to be in the second of the segments.

9. The brushless electrical machine as recited in claim 1, wherein a total number of the predefined angular segments equals the number y of pole pairs of the magnetic ring.

10. The brushless electrical machine as recited in claim 1, wherein, for each of the target movements of the algorithmic sequence, the respective number of degrees of the respective target movement is a respective multiple of $(360°/(x*y))$.

11. The brushless electrical machine as recited in claim 1, wherein the combinations predefined by the program include:
    (i) a determination that the rotor did not move in response to the output of current corresponding to a first one of the target movements defined to occur first-in-time in the algorithmic sequence of steps, in response to which the control unit is programmed by the program to determine that the rotor is in a first of the segments;
    (ii) a determination that the rotor moved according the first one of the target movements, followed by a further one of the outputs of current to move the rotor with a second one of the target movements, followed by a determination that the rotor moved in a direction opposite to the second one of the target movements, in response to which the control unit is programmed by the program to determine that the rotor is in a second of the segments;
    (iii) a determination that the rotor moved according the first one of the target movements, followed by the further one of the outputs of current to move the rotor with the second one of the target movements, followed by a determination that the rotor did not move in the direction opposite to the second one of the target movements, in response to which the control unit is programmed by the program to determine that the rotor is in a third of the segments;
    (iv) a determination that the rotor moved in a direction opposite to the first one of the target movements in response to the output of current corresponding to the first one of the target movements, followed by the further one of the outputs of current to move the rotor with the second one of the target movements, followed by a determination that the rotor did not move according to the second one of the target movements, in response to which the control unit is programmed by the program to determine that the rotor is in a fourth of the segments; and
    (v) a determination that the rotor moved in the direction opposite to the first one of the target movements in response to the output of current corresponding to the first one of the target movements, followed by the further one of the outputs of current to move the rotor with the second one of the target movements, followed by a determination that the rotor moved according to the second one of the target movements in response to the output of current corresponding to the second one of the target movements, in response to which the control unit is programmed by the program to cause a third one of the outputs of current and determine that the rotor is in a fifth of the segments.

* * * * *